United States Patent
Bhatia et al.

(10) Patent No.: US 12,358,780 B2
(45) Date of Patent: Jul. 15, 2025

(54) SYSTEM AND METHOD FOR AUTONOMOUSLY CONTROLLING FLUID REFILL STATION

(71) Applicant: Caterpillar Inc., Peoria, IL (US)

(72) Inventors: Ruchi Bhatia, Dunlap, IL (US); Mark Banham, Victoria Point (AU)

(73) Assignee: Caterpillar Inc., Peoria, IL (US)

( * ) Notice: Subject to any disclaimer, the term of this patent is extended or adjusted under 35 U.S.C. 154(b) by 446 days.

(21) Appl. No.: 17/819,642

(22) Filed: Aug. 15, 2022

(65) Prior Publication Data

US 2024/0051814 A1    Feb. 15, 2024

(51) Int. Cl.
*B67D 7/32*      (2010.01)
*G05B 15/02*   (2006.01)

(52) U.S. Cl.
CPC ........... *B67D 7/3281* (2013.01); *G05B 15/02* (2013.01); *B67D 2007/329* (2013.01)

(58) Field of Classification Search
CPC ..................................................... B67D 7/145
See application file for complete search history.

(56) References Cited

U.S. PATENT DOCUMENTS

| | | | |
|---|---|---|---|
| 5,785,100 A * | 7/1998 | Showalter | B67D 7/362 141/59 |
| 8,607,403 B2 | 12/2013 | Van Den Berg et al. | |
| 9,850,119 B2 | 12/2017 | Westrich et al. | |
| 2009/0298539 A1* | 12/2009 | Anderson | G05D 1/0225 455/556.1 |
| 2012/0232750 A1 | 9/2012 | Leigh | |
| 2014/0180914 A1* | 6/2014 | Abhyanker | G06Q 10/0832 705/332 |
| 2015/0251893 A1 | 9/2015 | Jonasson et al. | |
| 2020/0108713 A1* | 4/2020 | Bennie | B60K 15/00 |
| 2021/0312406 A1* | 10/2021 | Dedes | G06N 3/006 |
| 2022/0122383 A1 | 4/2022 | Fritz et al. | |
| 2023/0150811 A1* | 5/2023 | Li | F17C 13/02 141/94 |

FOREIGN PATENT DOCUMENTS

| | | |
|---|---|---|
| CA | 2876467 | 9/2014 |
| DE | 102020003932 A1 | 8/2020 |
| WO | 0140104 | 6/2001 |
| WO | 2011137276 | 11/2011 |

OTHER PUBLICATIONS

Written Opinion and International Search Report for Int'l. Patent Appln. No. PCT/US2023/071093, mailed Oct. 31, 2023 (11 pgs).

* cited by examiner

*Primary Examiner* — Nathan L Laughlin

(57) ABSTRACT

A system for autonomously controlling a fluid refill station (FRS) includes a sensor that generates an input signal indicative of an amount of fluid in a tank of an autonomous truck and a central controller. The central controller monitors the amount of fluid in the tank and assigns the autonomous truck to the FRS if the amount of fluid has reached a minimum threshold value. The central controller determines an alignment of the tank of the autonomous truck with a fluid outlet of the FRS, directs the FRS to refill the tank with fluid if the tank is in alignment with the fluid outlet of the FRS, and directs the FRS to stop refilling the tank when the amount of fluid in the tank has reached a maximum threshold value. The central controller marks the FRS as non-functional based on a determination of an anomaly with the FRS.

16 Claims, 5 Drawing Sheets

SYSTEM AND METHOD FOR AUTONOMOUSLY CONTROLLING FLUID REFILL STATION

TECHNICAL FIELD

The present disclosure generally relates to a fluid dispensing facility, and more particularly, to a system and a method for autonomously controlling a fluid refill station of the fluid dispensing facility for refilling tanks of autonomous trucks with fluid, for e.g., water.

BACKGROUND

A worksite, such as a construction site or a mining site, may generate dust as a result of construction or mining activities carried out thereon. The dust generated at the worksite may adversely affect operator visibility, machine operations being performed at the worksite, and/or maintaining clean engine filters, machines themselves, and the worksite. In an event, when autonomous machines are deployed for mining/construction, dust may severely impact their operation as sensors on these machines may not detect/perceive correct data due to low visibility. To that end, it may be prudent to spray a dust mitigation fluid e.g., water over the worksite using dedicated mobile resources, such as, trucks. However, when such mobile fluid transport and spraying resources deplete off the fluid, the resources would need to be refilled with water from a source, such as, an overhead tank.

Typically, personnel may be deployed for monitoring of the refilling process. However, the refilling process may be inefficient as multiple trucks can potentially crowd up at the overhead tank at a single time. Hence, there is a need for a system that regulates operation of the overhead tanks whilst minimizing human effort in scheduling a movement of the trucks while preventing adverse situations, such as, overfilling of the trucks, spillage of the fluid from the overhead tanks, etc. As the fluid may be an expensive commodity at worksites, and more particularly remote worksites, overfilling and/or spillage of the fluid may be undesirable from an economic and sustainability standpoint. In one scenario, the personnel monitoring the refilling process may stop the refilling process before the fluid in the resource has reached an optimal fill capacity, causing underfilling of the resource. The underfilling of the resource may affect a productivity and an efficiency at the worksite as the trucks may have to be refilled often.

U.S. Pat. No. 8,607,403 discloses an autonomous movable vehicle including a propelling device and a fluid receiving conduit having at least one fill opening through which a container can be filled. The autonomous vehicle also includes at least one fluid dispensing opening through which a fluid is dispensed and a controller that causes the vehicle to autonomously approach a fluid delivery station that is separate from the vehicle. The controller also causes the fill opening of the fluid receiving conduit to couple to the fluid delivery station. Further, fluid is transferred from the fluid delivery station into the container based on the coupling of the fill opening with the fluid delivery station. The fill opening of the fluid receiving conduit is disposed at a location spaced apart from and to one side of a central mirror axis of the vehicle that extends in the direction of travel of the vehicle.

SUMMARY

In an aspect of the present disclosure, a system for autonomously controlling a fluid refill station (FRS) is provided. The FRS is configured to refill fluid in a tank of at least one autonomous truck operating at a worksite. The system includes a sensor configured to generate an input signal indicative of an amount of fluid in the tank of the autonomous truck. The system also includes a central controller coupled in communication with the sensor. The central controller is configured to monitor the amount of fluid in the tank of the autonomous truck based on the input signal received from the sensor. The central controller is also configured to assign the autonomous truck to the FRS if the amount of fluid in the tank has reached a minimum threshold value. The central controller is further configured to determine an alignment of the tank of the autonomous truck with a fluid outlet of the FRS. The central controller is configured to direct the FRS to refill the tank of the autonomous truck with fluid if the tank of the autonomous truck is in alignment with the fluid outlet of the FRS. The central controller is also configured to direct the FRS to stop refilling the tank when the amount of fluid in the tank has reached a maximum threshold value. The central controller is further configured to mark the FRS as non-functional based on a determination of an anomaly with the FRS.

In another aspect of the present disclosure, a method of autonomously controlling a fluid refill station (FRS). The FRS is configured to refill fluid in a tank of at least one autonomous truck operating at a worksite. The method includes monitoring an amount of fluid in the tank of the autonomous truck. The method also includes assigning the autonomous truck to the FRS if the amount of fluid in the tank has reached a minimum threshold value. The method further includes determining an alignment of the tank of the autonomous truck with a fluid outlet of the FRS. The method includes directing the FRS to refill the tank of the autonomous truck with fluid if the tank of the autonomous truck is in alignment with the fluid outlet of the FRS. The method also includes directing the FRS to stop refilling the tank when the amount of fluid in the tank has reached a maximum threshold value. The method further includes marking the FRS as non-functional based on a determination of an anomaly with the FRS.

In yet another aspect of the present disclosure, a facility provided at a worksite is provided. The facility includes at least one autonomous truck including a tank. The facility also includes a fluid refill station (FRS) configured to refill the tank of the autonomous truck with fluid. The facility further includes a system in communication with the autonomous truck and the FRS. The system is configured to autonomously control at least the FRS. The system includes a sensor configured to generate an input signal indicative of an amount of fluid in the tank of autonomous truck. The system also includes a central controller coupled in communication with the sensor. The central controller is configured to monitor the amount of fluid in the tank of the autonomous truck based on the input signal received from the sensor. The central controller is also configured to assign the autonomous truck to the FRS if the amount of fluid in the tank has reached a minimum threshold value. The central controller is further configured to determine an alignment of the tank of the autonomous truck with a fluid outlet of the FRS. The central controller is configured to direct the FRS to refill the tank of the autonomous truck with fluid if the tank of the autonomous truck is in alignment with the fluid outlet of the FRS. The central controller is also configured to direct the FRS to stop refilling the tank when the amount of fluid in the tank has reached a maximum threshold value.

The central controller is further configured to mark the FRS as non-functional based on a determination of an anomaly with the FRS.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
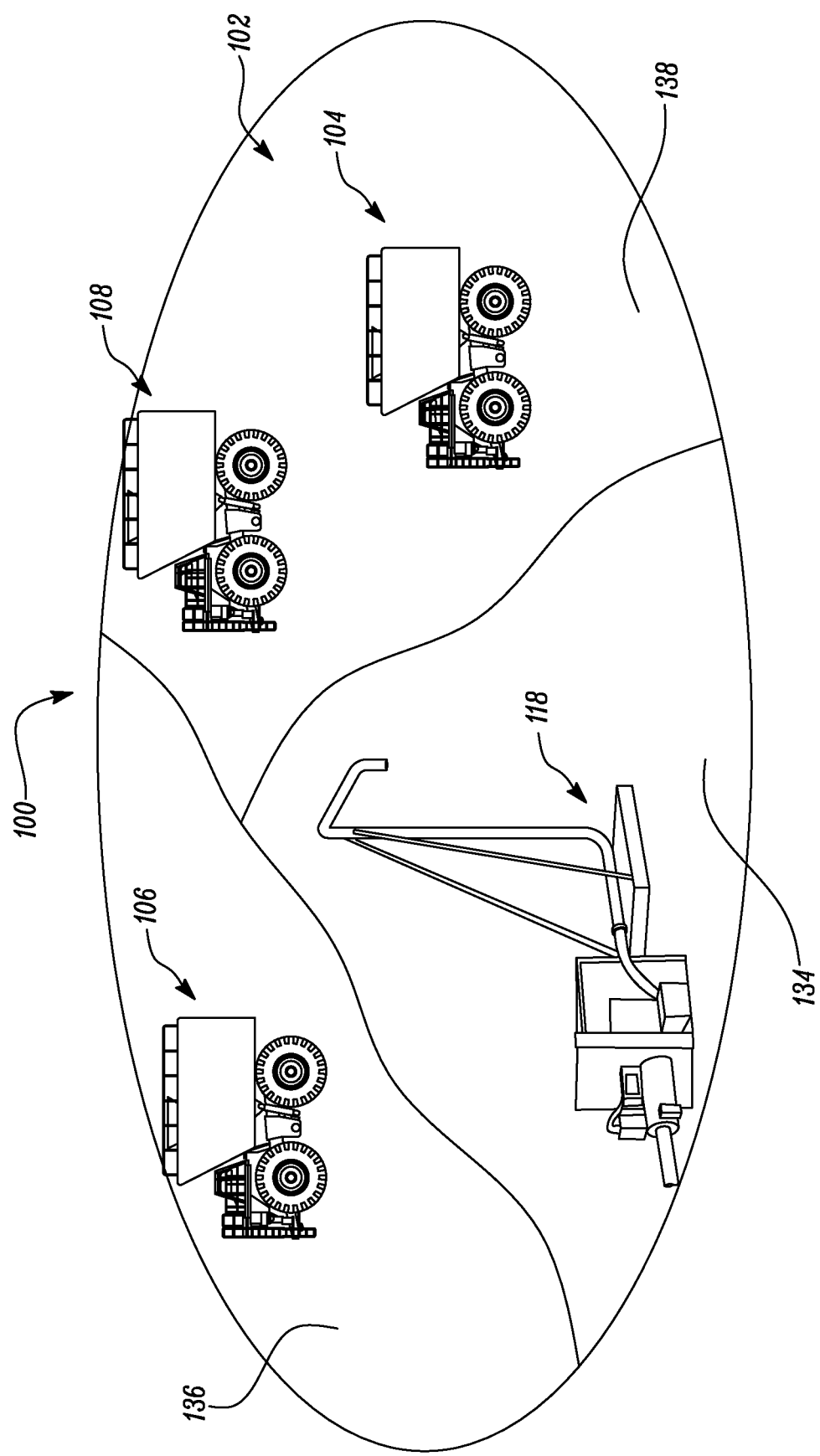
FIG. 1 is a pictorial view depicting a number of autonomous trucks and a fluid refill station (FRS) at a worksite, according to an exemplary embodiment of the present disclosure.

Referring to FIG. 1, an exemplary worksite 100 is illustrated. The worksite 100 may include, for example, a mine site, a land fill, a quarry, a construction site, or a landscape site.

The worksite 100 includes a facility 102. The facility 102 may be embodied as a dust reduction facility, a road maintenance facility, or any facility that is capable of dispensing fluid therefrom. Fluid as disclosed herein may be regarded as comprising for e.g., water alone, water with any additives therein, etc. The facility 102 may include a number of autonomous trucks. These autonomous trucks 104, 106, 108 may operatively spray fluid, for e.g., water at the worksite 100. For purposes of simplicity, three autonomous trucks 104, 106, 108 are disclosed. However, any number of autonomous trucks and/or any number of work machines (not shown herein) may operate at the worksite 100. The work machines may include any type of machine used for performing work operations, such as, loading, hauling, dumping, filling, cutting, excavating, spreading, compacting, grading, or dozing at the worksite 100.

The worksite 100 may be virtually divided into a number of zones 134, 136, 138. The autonomous trucks 104, 106, 108 may be used to spray fluid at any zone 134, 136, 138 of the worksite 100. Additionally, or optionally, these autonomous trucks 104, 106, 108 may be dynamically assigned to move between the zones 134, 136, 138 for spraying fluid, as per requirements. In the illustrated embodiment of FIG. 1, the autonomous trucks 104, 108 are present at the zone 138, and the autonomous truck 106 is present at the zone 136.

Figure 2:
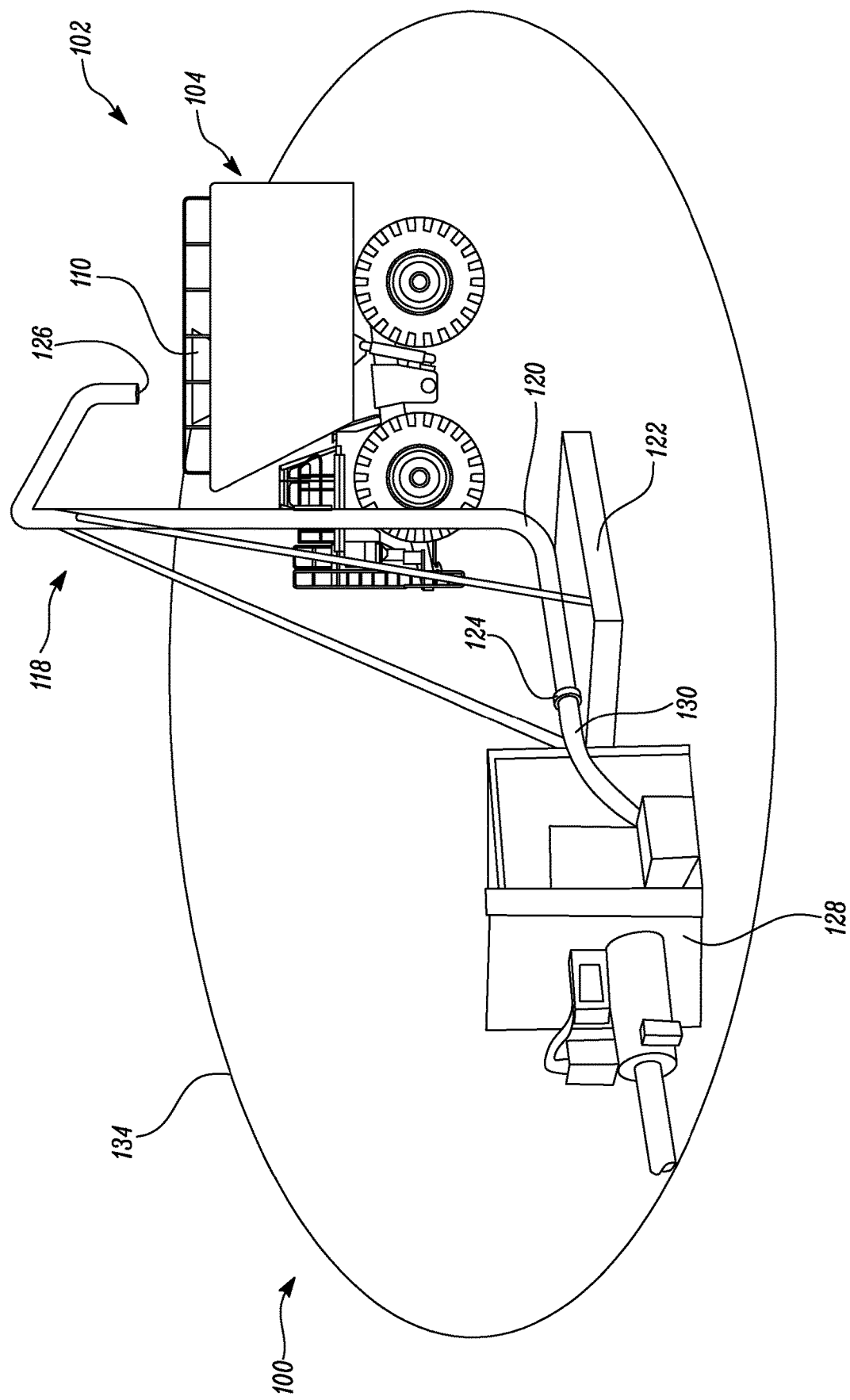
FIG. 2 is a pictorial view depicting the autonomous truck docked at the FRS.

The autonomous truck 104 will now be explained with reference to FIG. 2. It must be understood that such explanation is similarly, or equally, applicable to any of the other autonomous trucks (such as, the autonomous trucks 106, 108 shown in FIG. 1) present at the worksite 100. Referring to FIG. 2, the autonomous truck 104 includes a tank 110. The tank 110 may hold fluid that is to be sprayed at the worksite 100. In the illustrated embodiment of FIG. 2, the tank 110 may define an opening disposed overhead, or on, a body of the tank 110. During refilling of the tank 110, fluid is received within the tank via the opening in the tank 110. The tank 110 described herein defines the opening at a top wall of the body of the tank 110. Alternatively, the opening may be defined at a side wall of the body of the tank 110. In a situation wherein the opening is present in the side wall of the tank 110, the autonomous truck 104 may include a suitable fluid receiving system that may extend or retract to allow refilling of the tank 110 with the fluid. The tank 110 may be centrally located behind an operator cabin (not shown) of the autonomous truck 104. Alternatively, the tank 110 may be located at a left side or a right side of the autonomous truck 104.

The facility 102 further includes a fluid refill station (FRS) 118. The FRS 118 refills fluid in the tank 110 of the autonomous truck 104 operating at the worksite 100. The fluid being refilled by the FRS 118 includes water. In addition to water, the fluid may also include one or more additives, as per application requirements. In the illustrated embodiment of FIG. 2, the FRS 118 is present at the zone 134. However, the FRS 118 may be present at any of the zones 136, 138 (see FIG. 1), without any limitation thereto. It should be noted that the FRS 118 may be used to refill fluid in the tank 110 of the autonomous truck 104 and tanks (not shown) of the autonomous trucks 106, 108 (see FIG. 1), without any limitation thereto. Although a single FRS 118 is illustrated in FIGS. 1 and 2, the facility 102 may include multiple fluid refill stations, based on a size of the worksite 100.

Further, the FRS 118 includes a dispenser 120. The dispenser 120 may include a pipe arrangement that may be supported on a ground surface by a bracket 122. The dispenser 120 defines a fluid inlet 124 and a fluid outlet 126. When the tank 110 is being refilled, the autonomous truck 104 may be positioned such that the opening of the tank 110 is in alignment with the fluid outlet 126 so that fluid leaving the fluid outlet 126 may be received within the tank 110. It should be noted that the term "the tank 110 is in alignment with the fluid outlet 126" as used in this disclosure may imply that the opening of the tank 110 is in-line with the fluid outlet 126 or the tank 110 may be in alignment/fluid communication with the fluid outlet 126 via a component, such as, a tubing, so that fluid exiting the fluid outlet 126 may be received within the tank 110. In the illustrated embodiment of FIG. 2, the fluid outlet 126 needs to be vertically aligned with the tank 110 so that fluid exiting the dispenser 120 may be received, under or by force of gravity alone, within the tank 110. However, alternatively, a tube (such as, a flexible hose) may be used to define an alignment/fluid communication between the fluid outlet 126 and the tank 110 so that fluid exiting the dispenser 120 may be received within the tank 110.

The FRS 118 also includes a pump 128 that may pressurize fluid received from a fluid source (not shown). The pump 128 may direct the fluid towards the dispenser 120, via the fluid inlet 124. The pump 128 may be in fluid communication with the fluid inlet 124 of the dispenser 120 via a fluid hose 130. It should be noted that details pertaining to a design and components of the FRS 118 as mentioned herein are exemplary in nature, and the FRS 118 may include any other design or combination of components to allow fluid refilling.

Figure 3:
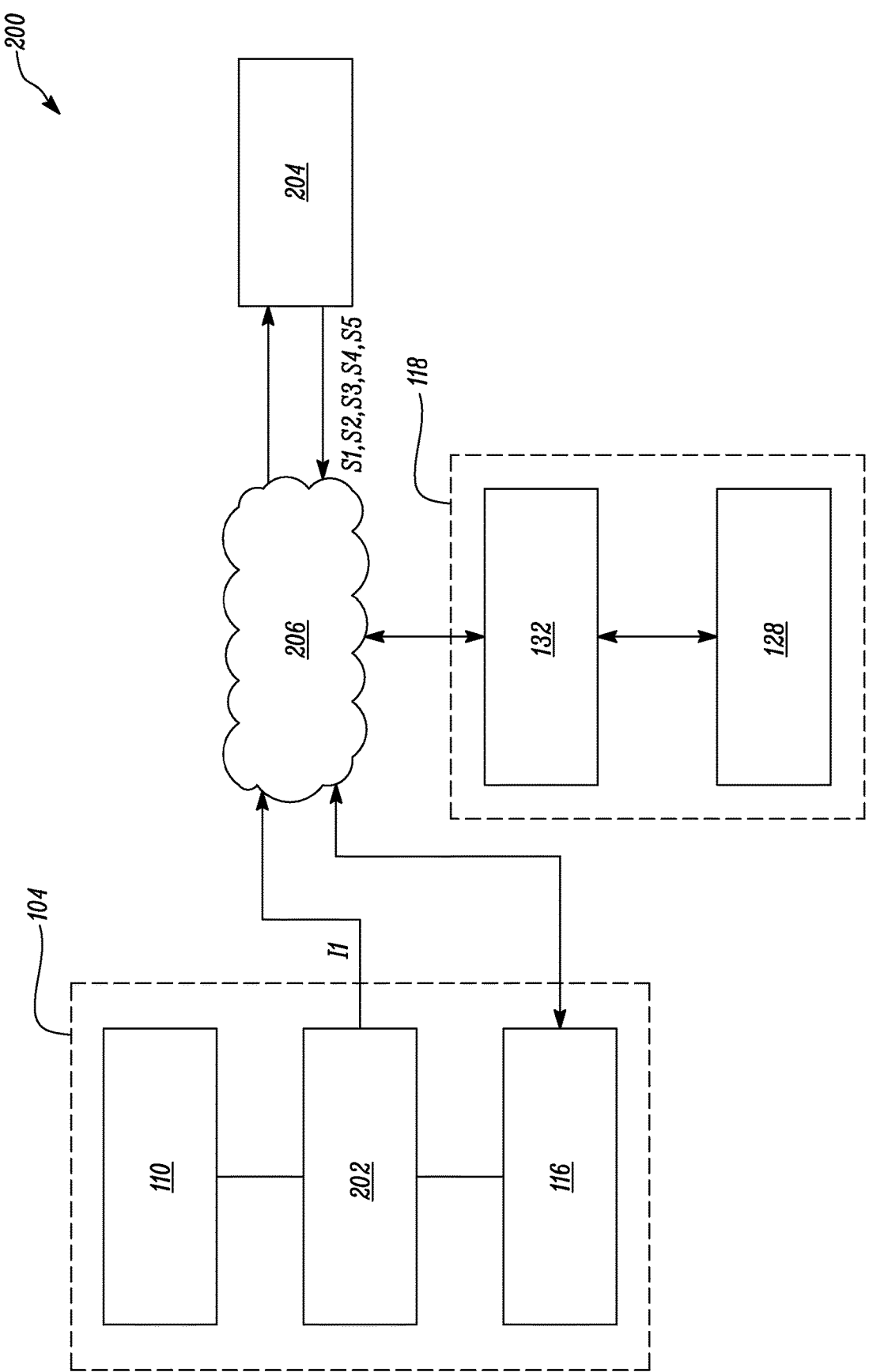
FIG. 3 is a block diagram of a system for autonomously controlling the FRS, according to an exemplary embodiment of the present disclosure.

Referring to FIG. 3, the FRS 118 includes a first controller 132 associated therewith. The first controller 132 may generate and transmit control signals to activate and/or deactivate the pump 128 of the FRS 118 so that fluid may be selectively directed towards the dispenser 120 (see FIG. 2). The first controller 132 may activate the pump 128 when the tank 110 is to be refilled and the first controller 132 may deactivate the pump 128 when the tank 110 is filled up to a desired capacity. The first controller 132 may determine, store, and transmit information related to a first flow rate value F1 at the FRS 118. The first flow rate value F1 may be indicative of a flow rate at which the fluid exits the fluid outlet 126 (see FIG. 2) or the pump 128. It should be noted that a sensor (not shown herein) may be associated with the dispenser 120 or the pump 128 that may allow calculation of the first flow rate value F1. The first controller 132 may also store and transmit information related to a current operating status of the FRS 118. For example, the first controller 132 may report that the FRS 118 is in an active state when the pump 128 is activated and the first controller 132 may report that the FRS 118 is in an inactive state when the pump 128 is deactivated. The first controller 132 may also store and transmit information related to any operating errors associated with the pump 128.

Further, the autonomous truck 104 includes a second controller 116 associated therewith. The second controller 116 may be present onboard the autonomous truck 104. The second controller 116 may store and transmit information related to a current location of the autonomous truck 104 at the worksite 100 (see FIG. 1), a speed of the autonomous truck 104, a work schedule of the autonomous truck 104 for a particular workday, or any anomalies with the autonomous truck 104. It should be noted that the term "anomaly" as used in the present disclosure may relate to any faults, discrepancies, or errors with a device that may cause the corresponding device to work in an unintended or undesirable manner.

Further, the facility 102 (see FIGS. 1 and 2) includes a system 200 for autonomously controlling the FRS 118. The system 200 is in communication with the one or more autonomous trucks 104, 106, 108 (see FIG. 1) and the FRS 118. It should be noted that the system 200 autonomously controls at least the FRS 118. In other words, in addition to the FRS 118, the system 200 may further control the autonomous trucks 104, 106, 108 or any other work machine present at the worksite 100. For explanatory purposes, the system 200 will be explained in reference to the refilling of the tank 110 of the autonomous truck 104 by the FRS 118. However, the system 200 is equally applicable to refilling of the tanks of the autonomous trucks 106, 108 by the FRS 118. It should be noted that the system 200 as described herein may be used to control operation of each FRS present at the worksite 100, without any limitation thereto.

The system 200 includes a sensor 202 that generates an input signal I1 indicative of an amount of fluid in the tank 110 of the autonomous truck 104. The sensor 202 may be disposed at a suitable location, so that the sensor 202 may generate the input signal I1 indicative of the amount of fluid in the tank 110. In one example, the sensor 202 may determine a fluid level of the fluid in the tank 110. Accordingly, the sensor 202 may include a fluid level sensor. In another example, the sensor 202 may determine a weight of fluid in the tank 110. The sensor 202 may be a contact type sensor or a non-contact type sensor. The sensor 202 may include an optical sensor, a capacitance sensor, a tuning fork sensor, a diaphragm sensor, a float sensor, or an ultrasonic sensor, without any limitation thereto. The sensor 202 may include a pressure sensor, such as, a strut pressure sensor. It should be noted that the sensor 202 may include, but is not limited to, inertial measurement units or any other type of sensor, which may allow calculation of the amount of fluid in the tank 110. It should be noted that the sensor 202 may include single sensing device or a group of sensing devices that may be used to determine the amount of fluid in the tank 110.

The system 200 further includes a central controller 204 coupled in communication with the sensor 202. The first controller 132 is also coupled in communication with the central controller 204. Further, the central controller 204 is coupled in communication with the second controller 116.

The system 200 further includes a communication system 206 at the worksite 100. The communication system 206 establishes communication between the central controller 204 and the FRS 118. Specifically, the communication system 206 establishes communication between the central controller 204 and the first controller 132. As illustrated in FIG. 3, the sensor 202 and the second controller 116 are also coupled in communication with the central controller 204 via the communication system 206.

Examples of the communication system 206 may include, but are not limited to, a Wide Area Network (WAN), a Local Area Network (LAN), an internet, an intranet, a cellular network, a satellite network, Wi-Fi, Bluetooth, or any other known network for transmitting and receiving data. In various examples, the communication system 206 may include a combination of two or more of the aforementioned networks and/or other types of networks known in the art.

Each of the central controller 204, the first controller 132, and the second controller 116 may include one or more memories (e.g., a non-transitory computer readable medium) and one or more processors communicably coupled with the one or more memories. The memories may include, for example, a flash memory, a random-access memory (RAM), and an electrically erasable programmable read-only memory (EEPROM). The memories may store data, such as, algorithms, instructions, and arithmetic operations. The central controller 204, the first controller 132, and the second controller 116 may execute various types of digitally stored instructions, such as, a software or an algorithm, retrieved from the memories, or a firmware program which may enable the corresponding central controller 204, the first controller 132, and the second controller 116 to perform a wide variety of operations. Although aspects of the present disclosure may be described generally as being stored in the memories, it may be contemplated that these aspects may be stored on, and read from, different types of computer program products or computer-readable media such as hard disks, floppy disks, optical media, compact disc-read only memory (CD-ROM), or other forms of RAM or read only memory (ROM).

Moreover, these processors may be any device that is configured to execute code and perform logical operations. It should be noted that the processors may embody a single microprocessor or multiple microprocessors for receiving various input signals. Numerous commercially available microprocessors may be configured to perform the functions of the processors. The processors may further include a general processor, a central processing unit, an application specific integrated circuit (ASIC), a digital signal processor, a field programmable gate array (FPGA), a digital circuit, an analog circuit, a controller, a microcontroller, any other type of processor, or any combination thereof. The processors may include one or more components that may be operable to execute computer executable instructions or computer code that may be stored and retrieved from the memories.

It should be noted that the central controller 204 controls the fluid dispensing process associated with the FRS 118 and the fluid refilling process associated with the tank 110 of the autonomous truck 104. Further, the central controller 204 described herein also determines any anomalies with the FRS 118, the autonomous truck 104, the communication system 206, or the worksite 100. Based on the determination of the types and/or extents of respective ones of the anomalies, the central controller 204 either terminates the fluid refilling process of the tank 110 or marks the FRS 118 as non-functional. Specifically, the central controller 204 marks the FRS 118 as non-functional based on the determination of the anomaly with the FRS 118. Moreover, the central controller 204 generates a third control signal S3 to mark the FRS 118 as non-functional. The third control signal S3 as generated by the central controller 204 may cause the FRS 118 to be put on hold. Specifically, based on the third control signal S3, the central controller 204 may not assign any autonomous trucks 104, 106, 108 to the FRS 118 for fluid refilling. In an example, the central controller 204 transmits the third control signal S3 to the number of autonomous trucks 104, 106, 108 at the worksite 100 to indicate that the FRS 118 is non-functional so as to prevent subsequent assignment of any of the number of autonomous trucks 104, 106, 108 to the FRS 118.

In some embodiments of the present disclosure, an anomaly with the FRS 118 should also be regarded as inclusive of any or all of, for example, a loss or lag in communication between the central controller 204 and the first controller 132, a faulty operation of the first controller 132, a breakdown of one or more systems associated with the FRS 118, without any limitation thereto. In some embodiments of the present disclosure, an anomaly with the second controller 116 should also be regarded as inclusive of any or all of, for example, a loss or lag in communication between the central controller 204 and the second controller 116, a faulty operation of the second controller 116, a breakdown of one or more systems associated with the autonomous truck 104, without any limitation thereto.

Further, the central controller 204 also generates a failure report based on the determination of the anomaly with the FRS 118. The failure report may include details pertaining to a number of times the FRS 118 may be marked as non-functional, reasons for which the FRS 118 may be marked as non-functional, or any other relevant details pertaining to the FRS 118 that may assist a user to troubleshoot or improve an efficiency of the fluid refilling process.

Further, the central controller 204 monitors the amount of fluid in the tank 110 of the autonomous truck 104 based on the input signal I1 received from the sensor 202. In an example, the sensor 202 may transmit the input signal I1 directly to the central controller 204. In another example, the sensor 202 may transmit the input signal I1 to the second controller 116. The second controller 116 may in turn transmit an information pertaining to the amount of fluid in the tank 110 to the central controller 204. It should be noted that the central controller 204 may receive the input signal I1 at regular intervals. Further, the central controller 204 may query the sensor 202 for receiving the input signal I1, as and when required. Further, the central controller 204 assigns the autonomous truck 104 to the FRS 118 if the amount of fluid in the tank 110 has reached a minimum threshold value V1. It should be noted that the central controller 204 may assign the autonomous truck 104 to a particular FRS based on factors, such as, a distance between the autonomous truck 104 and a particular FRS, a number of autonomous trucks currently in queue for fluid refilling at a particular FRS, and the like. Additionally, the central controller 204 may also determine if a path that leads the autonomous truck 104 to a particular FRS includes traffic or other hindrances, such as, machine breakdown or landslides that may render the path unmotorable. If the central controller 204 determines that the path towards a particular FRS includes traffic or other hindrances, the central controller 204 may assign the autonomous truck 104 to another FRS at the worksite 100. Further, the central controller 204 may also determine if any FRS at the worksite 100 is in non-functional before assigning the autonomous truck 104 to a particular FRS.

Further, the minimum threshold value V1 may be defined based on a user input, may be determined by the central controller 204, or may be prestored within the memory of the central controller 204. It should be noted that the minimum threshold value V1 may be determined based on tasks assigned to the autonomous truck 104. For example, the minimum threshold value V1 may depend on an amount of fluid that needs to be dispensed at the worksite 100, or on a portion, for example, corresponding to any one of the zones 134, 136, 138 (see FIG. 1) of the worksite 100, without any limitation thereto. In an example, the minimum threshold value V1 may be approximately between 5% and 15% of a volume of the tank 110, without any limitation thereto. In order to assign the autonomous truck 104 to the FRS 118, the central controller 204 may transmit a control signal to the second controller 116 so that the autonomous truck 104 moves towards the FRS 118. Further, the first controller 132 or the central controller 204 may also generate a navigable path of movement for the autonomous truck 104 so that the autonomous truck 104 may be positioned at the FRS 118 and the tank 110 is in alignment with the dispenser 120. Once the autonomous truck 104 is docked at the FRS 118, the first controller 132 may send a confirmation to the central controller 204 that the autonomous truck 104 is positioned at the FRS 118.

Further, the central controller 204 determines the alignment of the tank 110 of the autonomous truck 104 with the fluid outlet 126 of the FRS 118. Furthermore, the central controller 204 directs the FRS 118 to refill the tank 110 of the autonomous truck 104 with fluid if the tank 110 of the autonomous truck 104 is in alignment with the fluid outlet 126 of the FRS 118. More particularly, the central controller 204 generates a first control signal S1 to direct the FRS 118 to refill the tank 110. Further, the central controller 204 transmits the first control signal S1 to the first controller 132 that is coupled in communication with the central controller 204. However, if the central controller 204 determines that the tank 110 is not in alignment with the fluid outlet 126 of the FRS 118, the central controller 204 may instruct the second controller 116 to reposition the autonomous truck 104. In such situations, the second controller 116 may control the autonomous truck 104 so that the autonomous truck 104 may exit the FRS 118 and dock again.

Further, the central controller 204 directs the FRS 118 to stop refilling the tank 110 when the amount of fluid in the tank 110 has reached a maximum threshold value V2. More particularly, as the central controller 204 may periodically receive the input signal I1 indicative of the amount of fluid in the tank 110 from the sensor 202, the central controller 204 may compare the amount of fluid in the tank 110 with the maximum threshold value V2. Accordingly, when the amount of fluid in the tank 110 has reached the maximum threshold value V2, the central controller 204 may direct the FRS 118 to stop refilling the tank 110. The central controller 204 generates a second control signal S2 to direct the FRS 118 to stop refilling the tank 110. Further, the central controller 204 transmits the second control signal S2 to the first controller 132. Once the first controller 132 receives the second control signal S2, the first controller 132 may generate a signal to deactivate the pump 128 for stopping fluid supply towards the tank 110.

It should be noted that the maximum threshold value V2 may be defined based on a user input, may be determined by the central controller 204, or may be prestored within the memory of the central controller 204. It should be noted that the maximum threshold value V2 may be determined based on tasks assigned to the autonomous truck 104. For example, the maximum threshold value V2 may depend on an amount of fluid that needs to be dispensed at the worksite 100, or an area of the worksite 100 at which fluid needs to be dispensed, without any limitation thereto. It should be noted that the minimum and maximum threshold values V1, V2 may be dynamic in nature and may vary, as per application requirements. In an example, the maximum threshold value V2 may be approximately between 90% and 95% of the volume of the tank 110, without any limitation thereto.

Further, the central controller 204 generates the second control signal S2 or the third control signal S3 based on a determination of an anomaly with the communication system 206. For example, the central controller 204 may generate the second or third control signals S2, S3 if the central controller 204 detects that the communication system 206 is faulty or non-responsive, or if there is a lag in the communication system 206.

Further, the central controller 204 receives a first feedback from the first controller 132 confirming a receipt of the first control signal S1 by the first controller 132. The first feedback is a confirmation from the first controller 132 that the first controller 132 has received the first control signal S1 to start refilling the tank 110. It should be noted that a first time period T1 may exist between the transmission of the first control signal S1 by the central controller 204 and the receipt of the first feedback from the first controller 132. Further, the central controller 204 generates the third control signal S3 to mark the FRS 118 as non-functional based on a failure in receipt of the first feedback from the first controller 132. Specifically, the central controller 204 may wait until a lapse of the first time period T1 to receive the first feedback. However, if the central controller 204 does not receive the first feedback within the first time period T1, the central controller 204 generates the third control signal S3 to mark the FRS 118 as non-functional. It should be noted that the first time period T1 may be predetermined and stored in the memory of the central controller 204. In an example, a delay in the receipt of the first feedback or a non-receipt of the first feedback may be due to a fault in the communication system 206 or the first controller 132.

Further, once the first controller 132 receives the first control signal S1, the first controller 132 may transmit an activation signal to the pump 128 for activating the pump 128 and directing fluid towards the tank 110. Further, a second time period T2 may exist between receipt of the first feedback from the first controller 132 and receipt of fluid supply within the tank 110. The second time period T2 may be indicative of a time window between a time instance at which the activation signal transmits the first controller 132 and a time instance at which fluid supply is received within the tank 110. It should be noted that the second time period T2 may be predetermined and stored in the memory of the central controller 204.

Further, based on receipt of the first feedback from the first controller 132, the central controller 204 monitors the amount of fluid in the tank 110 to determine if the amount of fluid in the tank 110 is increasing. It should be noted that the central controller 204 may wait until a lapse of the second time period T2 to determine whether the amount of fluid in the tank 110 is increasing. Moreover, the central controller 204 generates the second control signal S2 or the third control signal S3 if the amount of fluid in the tank 110 is not increasing. Specifically, if the amount of fluid in the tank 110 is not increasing post receipt of the first feedback, the central controller 204 may determine that there may be a fault with the pump 128. Thus, the central controller 204 generates the second control signal S2 to stop refilling the tank 110 or the central controller 204 generates the third control signal S3 to mark the FRS 118 as non-functional until the fault is identified. Further, the central controller 204 may also monitor the first flow rate value F1. The first flow rate value F1 may be calculated by the first controller 132. If the first flow rate value F1 indicates that fluid is exiting the FRS 118, the central controller 204 may determine that the sensor 202 is faulty and generate the second control signal S2 to stop refilling the tank 110.

Additionally, based on receipt of the first feedback from the first controller 132, the central controller 204 compares the first flow rate value F1 at the FRS 118 with a second flow rate value F2 at which the amount of fluid in the tank 110 is increasing. Further, the second flow rate value F2 may be calculated by the central controller 204 based on the input signal I1 received from the sensor 202. Moreover, the central controller 204 generates the second control signal S2 if the first flow rate value F1 is different from the second flow rate value F2.

In an example, post receipt of the first feedback, the central controller 204 may receive an update from the first controller 132 indicating that the FRS 118 is in the inactive state. In one situation, the central controller 204 may determine that the amount of fluid in the tank 110 is increasing even when the FRS 118 is in the inactive state. In such a situation, the central controller 204 may generate the second control signal S2 to stop refilling the tank 110 and further generate the third control signal S3 to mark the FRS 118 as non-functional to indicate a probable error with the FRS 118.

Further, the central controller 204 receives a second feedback from the first controller 132 confirming a receipt of the second control signal S2 by the first controller 132. The second feedback is a confirmation from the first controller 132 that the first controller 132 has received the second control signal S2 to stop refilling the tank 110. It should be noted that a third time period T3 may exist between the transmission of the second control signal S2 by the central controller 204 and the receipt of the second feedback from the first controller 132. Further, the third time period T3 may be predetermined and stored in the memory of the central controller 204.

Furthermore, the central controller 204 generates the third control signal S3 to mark the FRS 118 as non-functional based on a failure in receipt of the second feedback from the first controller 132. Specifically, the central controller 204 may wait until a lapse of the third time period T3 to receive the second feedback. However, if the central controller 204 does not receive the first feedback within the third time period T3, the central controller 204 generates the third control signal S3 to mark the FRS 118 as non-functional. In an example, a delay in the receipt of the second feedback or a non-receipt of the second feedback may be due to a fault or lag in the communication system 206 or the first controller 132.

Further, a fourth time period T4 may exist between a time instant at which the second feedback is received from the first controller 132 and a time instant at which the tank 110 stops receiving the fluid supply. It should be noted that the fourth time period T4 may be predetermined and stored in the memories of the central controller 204. Further, based on the receipt of the second feedback from the first controller 132, the central controller 204 monitors the amount of fluid in the tank 110 to determine if the amount of fluid in the tank 110 is increasing. It should be noted that the central controller 204 may wait until a lapse of the fourth time period T4 to determine if the amount of fluid in the tank 110 is increasing. Moreover, the central controller 204 generates the third control signal S3 if the amount of fluid in the tank 110 is still increasing after the lapse of the fourth time period T4. Specifically, if the amount of fluid in the tank 110 is still increasing after the lapse of the fourth time period T4, the central controller 204 may determine that there may be a fault with the FRS 118. Thus, the central controller 204 may generate the third control signal S3 to mark the FRS 118 as non-functional until the fault is identified. The central controller 204 may also monitor the first flow rate value F1 after the lapse of the fourth time period T4. If the first flow rate value F1 is equal to zero, the central controller 204 may determine that the sensor 202 is faulty. Further, the central controller 204 may transmit information regarding the fault in the sensor 202 to the second controller 116.

However, if the central controller 204 determines that the amount of fluid in the tank 110 is not increasing, the central controller 204 generates a fourth control signal S4 to initiate an exit of the autonomous truck 104 from the FRS 118. The fourth control signal S4 is transmitted to the second controller 116. Based on the fourth control signal S4, the autonomous truck 104 may exit from the FRS 118, thereby completing a. fluid refill cycle.

Additionally, the central controller 204 may also generate a control signal S5 to indicate that the FRS 118 is in the inactive state and is not refilling any autonomous truck 104, 106, 108 currently. In an example, the central controller 204 may transmit the control signal S5 indicating the inactive state of the FRS 118 may be sent to the autonomous trucks 104, 106, 108, or other controllers. In an example, the central controller 204 may store information pertaining to the inactive state of the FRS 118 in the memories of the central controller 204. Such information may be used to determine time periods for which the FRS 118 has been in the active state and the inactive state.

In some cases, the central controller 204 also generates the second control signal S2 based on an operational halt at the worksite 100 or the zone 134 of the worksite 100. For instance, the central controller 204 may receive information if a site-wide stop has been implemented to stop all operations at the worksite 100. Based on the information, the central controller 204 may transmit the second control signal S2 to stop refilling the tank 110. In another instance, the central controller 204 may receive information if all operations at a specific zone for e.g., the zone 134 has been put on hold. It should be noted that operational halts can occur at any zone 134, 136, 138 of the worksite 100, however, for purposes of brevity, the operational halts have been described herein in reference to the zone 134, as the FRS 118 and the autonomous truck 104 are present at the zone 134. Based on the information related to the operational halt at the zone 134 of the worksite 100, the central controller 204 may transmit the second control signal S2 to stop refilling the tank 110. It should be noted that the zone 134 may include any other area of the worksite 100 at which the FRS 118 and the autonomous truck 104 are currently located.

Figure 4:
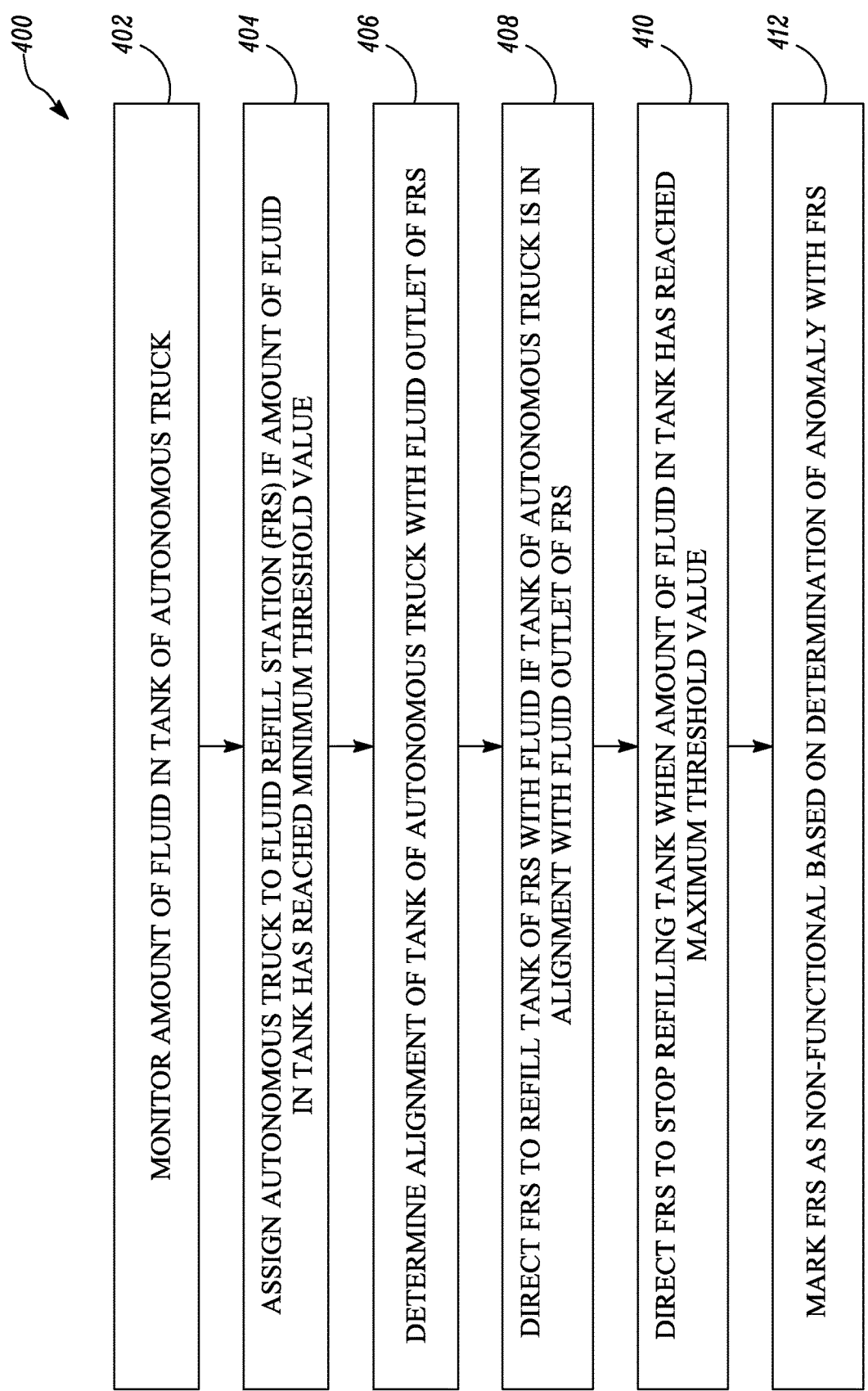
FIG. 4 is a flowchart for a method of autonomously controlling the FRS, according to an exemplary embodiment of the present disclosure.

FIG. 4 is a flowchart of a method 400 for autonomously controlling the FRS 118. As disclosed earlier herein, the FRS 118 refill fluid in the tank 110 of the autonomous truck 104 operating at the worksite 100. For explanatory purposes, the method 400 will be explained in relation to the refilling of the tank 110 of the autonomous truck 104. However, the method 400 is equally applicable to the refilling of the tank 110 of the autonomous trucks 106, 108. Moreover, the method 400 as described herein may be used to control each FRS present at the worksite 100.

Referring to FIGS. 2, 3, and 4, at step 402, the amount of fluid in the tank 110 of the autonomous truck 104 is monitored. At step 404, the autonomous truck 104 is assigned to the FRS 118 if the amount of fluid in the tank 110 has reached the minimum threshold value V1. At step 406, the alignment of the tank 110 of the autonomous truck 104 with the fluid outlet 126 of the FRS 118 is determined. At step 408, the FRS 118 is directed to refill the tank 110 of the autonomous truck 104 with fluid if the tank 110 of the autonomous truck 104 is in alignment with the fluid outlet 126 of the FRS 118. Further, the central controller 204 generates the first control signal S1 to direct the FRS 118 to refill the tank 110. The central controller 204 transmits the first control signal S1 to the first controller 132 that is coupled in communication with the central controller 204.

At step 410, the FRS 118 is directed to stop refilling the tank 110 when the amount of fluid in the tank 110 has reached the maximum threshold value V2. Further, the central controller 204 generates the second control signal S2 to direct the FRS 118 to stop refilling the tank 110. The central controller 204 transmits the second control signal S2 to the first controller 132.

At step 412, the central controller 204 generates the third control signal S3 for marking the FRS 118 as non-functional based on the determination of the anomaly with the FRS 118.

In an example, the central controller 204 receives the first feedback confirming the receipt of the first control signal S1 from the first controller 132 associated with the FRS 118 and the second feedback confirming the receipt of the second control signal S2 from the first controller 132. Further, the central controller 204 generates the third control signal S3 based on the failure in receipt of the first feedback or the second feedback from the first controller 132.

In another example, the central controller 204 compares the first flow rate value F1 at the FRS 118 with the second flow rate value F2 at which the amount of fluid in the tank 110 is increasing based on receipt of the first feedback from the first controller 132. Further, the central controller 204 generates the second control signal S2 if the first flow rate value F1 is different from the second flow rate value F2.

In yet another example, the central controller 204 monitors the amount of fluid in the tank 110 to determine if the amount of fluid in the tank 110 is increasing based on receipt of the first feedback from the first controller 132. Further, the central controller 204 generates the second control signal S2 or the third control signal S3 if the amount of fluid in the tank 110 is not increasing.

In an example, the central controller 204 monitors the amount of fluid in the tank 110 to determine if the amount of fluid in the tank 110 is increasing based on receipt of the second feedback from the first controller 132. Further, the central controller 204 generates the third control signal S3 if the amount of fluid in the tank 110 is increasing.

In another example, the central controller 204 generates the second control signal S2 based on the operational halt at the worksite 100 or the zone 134 of the worksite 100.

In yet another example, the central controller 204 generates the second control signal S2 or the third control signal S3 based on the determination of the anomaly with the communication system 206. The communication system 206 establishes the communication between the central controller 204 and the first controller 132.

Figure 5:
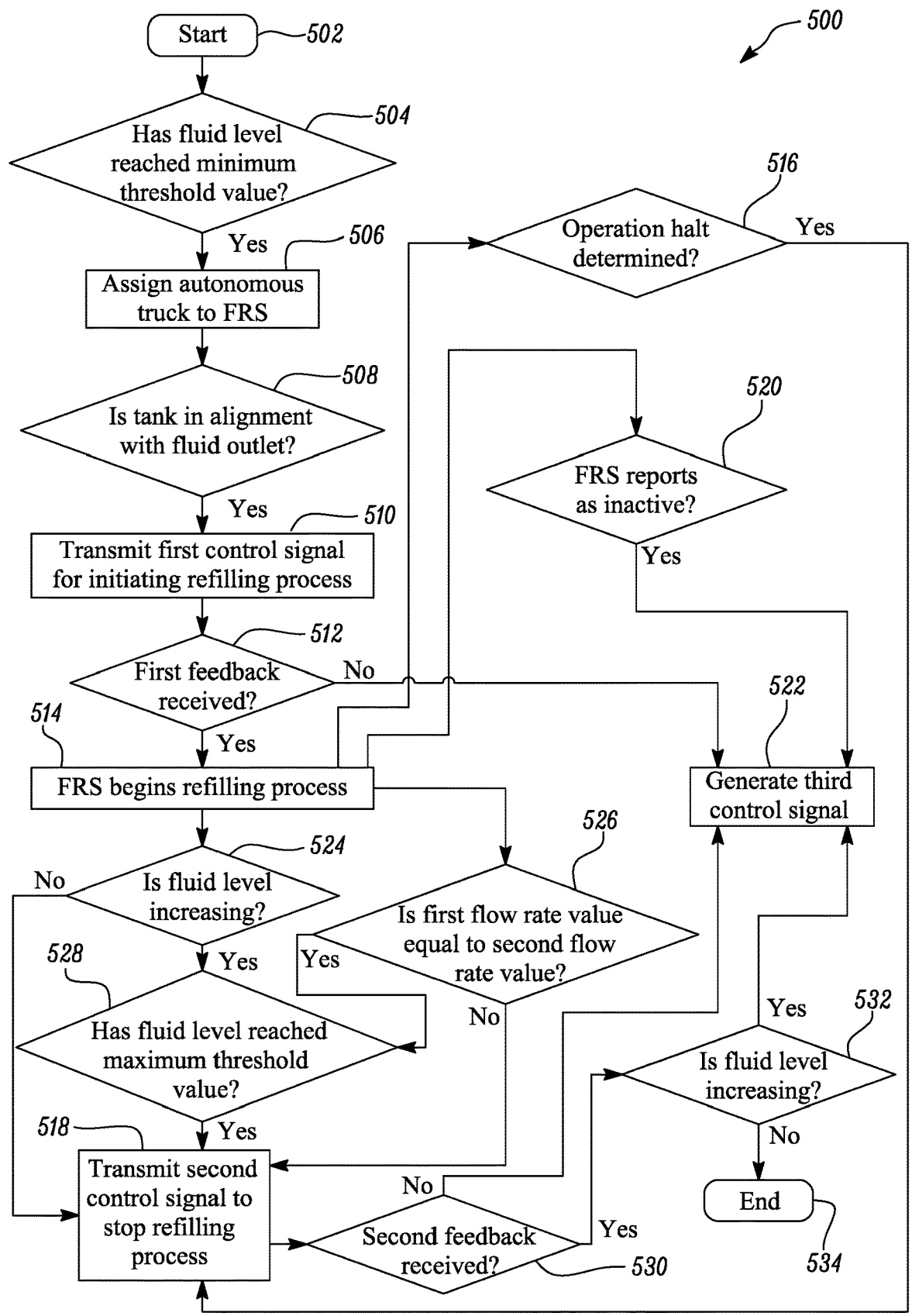
FIG. 5 is a process flowchart for low-level implementation of the method of FIG. 4, according to an exemplary embodiment of the present disclosure.

FIG. 5 is a flowchart of a process 500 for low-level implementation of the method 400 of FIG. 4. For explanatory purposes, the process 500 will be explained in relation to the refilling of the tank 110 of the autonomous truck 104 with fluid. However, the process 500 described herein is equally applicable for refilling of the tanks of the autonomous trucks 106, 108. Moreover, the process 500 may be equally applicable in the control of each FRS present at the worksite 100. Referring to FIGS. 2, 3, and 5, the process 500 may be executed by the central controller 204. The process 500 may be stored within the memory of the central controller 204 and may be retrieved for execution by the central controller 204. At a block 502, the process 500 starts or begin operation. At a block 504, the central controller 204 determines if the amount of fluid in the tank 110 has reached the minimum threshold value V1 based on the input signal I1 received from the sensor 202. If the central controller 204 determines that the amount of fluid in the tank 110 has reached the minimum threshold value V1, the process 500 moves to a block 506. At the block 506, the central controller 204 assigns the autonomous truck 104 to the FRS 118.

Further, at a block 508, the central controller 204 determines the alignment of the tank 110 of the autonomous truck 104 with the fluid outlet 126 of the FRS 118. If the tank 110 is in alignment with the fluid outlet 126 of the FRS 118, the process 500 moves to a block 510. However, if the tank 110 is not in alignment with the fluid outlet 126 of the FRS 118, the central controller 204 instructs the second controller 116 to reposition the autonomous truck 104.

At the block 510, the central controller 204 transmits the first control signal S1 to the first controller 132 for refilling the tank 110. At a block 512, if the central controller 204 receives the first feedback from the first controller 132 within the first time period T1, the process 500 moves to a block 514. At the block 514, the central controller 204 determines that the FRS 118 has begun refilling the tank 110 based on the first feedback received from the first controller 132. Further, at a block 516, if the central controller 204 receives any information indicative of the operational halt at the worksite 100 or the zone 134 of the worksite 100, the process 500 moves to a block 518. At the block 518, the central controller 204 generates the second control signal S2 to stop refilling the tank 110. Further, at a block 520, if the central controller 204 receives the update indicative of the inactive state of the FRS 118, the process 500 moves to a block 522. At the block 522, the central controller 204 generates the third control signal S3 to mark the FRS 118 as non-functional. Further, at the block 512, if the central controller 204 does not receive the first feedback from the first controller 132 within the first time period T1, the central controller 204 moves to the block 522 for generating the third control signal S3.

Furthermore, at a block 524, the central controller 204 determines if the amount of fluid in the tank 110 is increasing post receipt of the first feedback. If the amount of fluid in the tank 110 is not increasing, the process 500 moves to the block 518 at which the central controller 204 generates the second control signal S2 to stop refilling the tank 110. Moreover, at a block 526, the central controller 204 determines if the first flow rate value F1 corresponds to the second flow rate value F2. If the first flow rate value F1 does not correspond to the second flow rate value F2, the process 500 moves to the block 518 at which the central controller 204 generates the second control signal S2 to stop refilling the tank 110. However, at the blocks 524, 526, if the central controller 204 determines that the amount of fluid in the tank 110 is increasing and the first flow rate value F1 corresponds to the second flow rate value F2, respectively, the process 500 moves to a block 528. At the block 528, the central controller 204 determines if the amount of fluid in the tank 110 has reached the maximum threshold value V2. If the amount of fluid in the tank 110 has reached the maximum threshold value V2, the process 500 moves to the block 518 at which the central controller 204 generates the second control signal S2 to stop refilling the tank 110.

Further, at a block 530, the central controller 204 waits to receives the second feedback from the first controller 132 within the third time period T3. At the block 530, if the central controller 204 does not receive the second feedback from the first controller 132, the central controller 204 moves to the block 522 for generating the third control signal S3.

However, at the block 530, if the central controller 204 receives the second feedback from the first controller 132 within the third time period T3, the process 500 moves to a block 532. At the block 532, the central controller 204 determines if the amount of fluid in the tank 110 is increasing based on the input signal I1 received from the sensor 202. If the central controller 204 determines that the amount of fluid is increasing post receipt of the second feedback, the process 500 moves to the block 522 for generating the third control signal S3 to mark the FRS 118 as non-functional. However, at the block 532, if the central controller 204 determines that the amount of fluid in the tank 110 is not increasing, the process 500 moves to a block 534. At the block 534, the process 500 terminates or ends operation.

INDUSTRIAL APPLICABILITY

This section will now be explained in relation to the control of the water refilling process of the tank 110 of the autonomous truck 104 by the FRS 118. However, the details provided in this section are equally applicable to each FRS and each autonomous truck 106, 108 present at the worksite 100. The present disclosure relates to the system 200 and the method 400 for autonomously controlling the FRS 118. The system 200 and the method 400 described herein ensure that the tank 110 is refilled with fluid in an intended manner based on receipt of various feedbacks (such as, the first and second feedbacks) from the FRS 118. Further, the central controller 204 associated with the system 200 may either stop refilling the tank 110 or mark the FRS 118 as non-functional if the tank 110 is not being refilled in an intended manner.

The system 200 and the method 400 provides a fully automated technique of refilling the fluid in the tank 110 of the autonomous truck 104. Thus, the system 200 and the method 400 minimizes human effort in scheduling the movement of autonomous truck 104 for water refilling processes. Moreover, as human intervention is minimized, the fluid refilling process of the tank 110 may be less susceptible to errors. Accordingly, the system 200 and the method 400 may prevent underfilling of the tank 110. Thus, the tank 110 may not have to be refilled often, thereby reducing downtime associated with the autonomous truck 104, due to which a productivity and an efficiency at the facility 102 may improve. Moreover, the system 200 and the method 400 may prevent overfilling and/or spillage of fluid from the tank 110, thereby reducing fluid wastage. Thus, the system 200 and the method 400 describes herein may be advantageous from a sustainability as well as economic standpoint on account of judicious use of the fluid at the worksite 100. Additionally, the system 200 and the method 400 may prevent crowd up of various autonomous trucks 104, 106, 108 at the worksite 100 by virtue of improved schedule management of the water refilling process.

Further, the method 400 and the system 200 described herein may also determine various anomalies with the FRS 118 in order to either stop refilling the tank 110 or designate the FRS 118 as non-functional, thereby ensuring improved control over the fluid refilling process of the tank 110. Furthermore, the system 200 and the method 400 may consider any loss or lag of communication between the central controller 204 and the first controller 132, to either stop refilling the tank 110 or to designate the FRS 118 as non-functional. The system 200 and the method 400 may also terminate the fluid refilling process if there is any fault with the second controller 116 or if there is a lag/loss of communication between the central controller 204 and the second controller 116.

Additionally, if the central controller 204 determines operational halts at the worksite 100 (or any of the zones 134, 136, 138), the central controller 204 may promptly terminate refilling of the tank 110, thereby complying with current protocols at the worksite 100. Moreover, the central controller 204 may also generate failure reports that may be used for statistical analysis, productivity calculations, efficiency calculations, and the like. The system 200 and the method 400 described herein may be implemented at existing worksites or facilities with minimum modifications.

While aspects of the present disclosure have been particularly shown and described with reference to the embodiments above, it will be understood by those skilled in the art that various additional embodiments may be contemplated by the modification of the disclosed work machines, systems and methods without departing from the spirit and scope of the disclosure. Such embodiments should be understood to fall within the scope of the present disclosure as determined based upon the claims and any equivalents thereof.

What is claimed is:

1. A system for autonomously controlling a fluid refill station (FRS), the FRS being configured to refill fluid in a tank of at least one autonomous truck operating at a worksite, the system comprising:
   a sensor configured to generate an input signal indicative of an amount of fluid in the tank; and
   a central controller coupled in communication with the sensor, wherein the central controller is configured to:
      monitor the amount of fluid in the tank based on the input signal received from the sensor;
      assign the at least one autonomous truck to the FRS if the amount of fluid in the tank has reached a minimum threshold value;
      determine an alignment of the tank with a fluid outlet of the FRS;
      if the tank is in alignment with the fluid outlet, generate a first control signal to direct the FRS to refill the tank;
      transmit the first control signal to a first controller coupled in communication with the central controller;
      receive a first feedback from the first controller confirming a receipt of the first control signal by the first controller;
      direct the FRS to refill the tank of the at least one autonomous truck with fluid;
      when the amount of fluid in the tank has reached a maximum threshold value, generate a second control signal to direct the FRS to stop refilling the tank;
      transmit the second control signal to the first controller;
      receive a second feedback from the first controller confirming a receipt of the second control signal by the first controller;
      direct the FRS to stop refilling the tank;
      generate a third control signal to mark the FRS as non-functional based on at least one of:
         a failure in receipt of the first feedback from the first controller
         a failure in receipt of the second feedback from the first controller, or
         a determination of an anomaly with the FRS; and
      mark the FRS as non-functional based on the third control signal.

2. The system of claim 1, wherein the central controller is further configured to transmit the third control signal to a plurality of autonomous trucks at the worksite to indicate that the FRS is non-functional so as to prevent subsequent assignment of any of the plurality of autonomous trucks to the FRS.

3. The system of claim 1 further comprising a communication system at the worksite, wherein the communication system is configured to establish communication between the central controller and the first controller, and wherein the central controller is configured to generate at least one of the second control signal and the third control signal based on a determination of an anomaly with the communication system.

4. The system of claim 1, wherein the central controller is further configured to:
   monitor, based on receipt of the first feedback from the first controller, the amount of fluid in the tank to determine if the amount of fluid in the tank is increasing; and
   generate at least one of the second control signal and the third control signal if the amount of fluid in the tank is not increasing.

5. The system of claim 1, wherein the central controller is further configured to:
   monitor, based on receipt of the second feedback from the first controller, the amount of fluid in the tank to determine if the amount of fluid in the tank is increasing; and
   generate the third control signal if the amount of fluid in the tank is increasing.

6. The system of claim 1, wherein the central controller is further configured to:
   compare, based on receipt of the first feedback from the first controller, a first flow rate value at the FRS with a second flow rate value at which the amount of fluid in the tank is increasing; and
   generate the second control signal if the first flow rate value is different from the second flow rate value.

7. The system of claim 1, wherein the central controller is further configured to generate the second control signal based on an operational halt at any one of the worksite and a zone of the worksite.

8. A method of autonomously controlling a fluid refill station (FRS), the FRS being configured to refill fluid in a tank of at least one autonomous truck operating at a worksite, the method comprising:
   monitoring an amount of fluid in the tank;

assigning the at least one autonomous truck to the FRS if the amount of fluid in the tank has reached a minimum threshold value;

determining an alignment of the tank with a fluid outlet of the FRS;

if the tank is in alignment with the fluid outlet, generating, by a central controller, a first control signal to direct the FRS to refill the tank;

transmitting, by the central controller, the first control signal to a first controller that is coupled in communication with the central controller;

receiving, by the central controller, a first feedback from the first controller confirming a receipt of the first control signal by the first controller;

directing the FRS to refill the tank with fluid;

when the amount of fluid in the tank has reached a maximum threshold value, generating, by the central controller, a second control signal to direct the FRS to stop refilling the tank;

transmitting, by the central controller, the second control signal to the first controller;

receiving, by the central controller, a second feedback from the first controller confirming a receipt of the second control signal by the first controller;

directing the FRS to stop refilling the tank;

generating, by the central controller, a third control signal to mark the FRS as non-functional based on at least one of:
  a failure in receipt of the first feedback from the first controller,
  a failure in receipt of the second feedback from the first controller, or
  a determination of an anomaly with the FRS; and marking the FRS as non-functional based on the third control signal.

9. The method of claim 8 further comprising transmitting, by the central controller, the third control signal to a plurality of autonomous trucks at the worksite to indicate that the FRS is non-functional so as to prevent subsequent assignment of any of the plurality of autonomous trucks to the FRS.

10. The method of claim 8 further comprising generating, by the central controller, at least one of the second control signal and the third control signal based on a determination of an anomaly with a communication system, wherein the communication system is configured to establish communication between the central controller and the FRS.

11. The method of claim 8 further comprising:
monitoring, by the central controller, the amount of fluid in the tank to determine if the amount of fluid in the tank is increasing based on receipt of the first feedback; and
generating, by the central controller, at least one of the second control signal and the third control signal if the amount of fluid in the tank is not increasing.

12. The method of claim 8 further comprising:
monitoring, by the central controller, the amount of fluid in the tank to determine if the amount of fluid in the tank is increasing based on receipt of the second feedback; and
generating, by the central controller, the third control signal if the amount of fluid in the tank is increasing.

13. The method of claim 8 further comprising:
comparing, by the central controller, a first flow rate value at the FRS with a second flow rate value at which the amount of fluid in the tank is increasing based on receipt of the first feedback; and
generating, by the central controller, the second control signal if the first flow rate value is different from the second flow rate value.

14. The method of claim 8 further comprising generating, by the central controller, the second control signal based on an operational halt at any one of the worksite and a zone of the worksite.

15. A non-transitory computer readable medium having computer executable instructions for performing the method of claim 8.

16. A facility provided at a worksite, the facility comprising:
at least one autonomous truck including a tank;
a fluid refill station (FRS) configured to refill the tank of the at least one autonomous truck with fluid; and
a system in communication with the at least one autonomous truck and the FRS, the system configured to autonomously control at least the FRS, the system comprising:
  a sensor configured to generate an input signal indicative of an amount of fluid in the tank; and
  a central controller coupled in communication with the sensor, wherein the central controller is configured to:
    monitor the amount of fluid in the tank based on the input signal received from the sensor;
    assign the at least one autonomous truck to the FRS if the amount of fluid in the tank has reached a minimum threshold value;
    determine an alignment of the tank with a fluid outlet of the FRS;
    if the tank is in alignment with the fluid outlet, generate a first control signal to direct the FRS to refill the tank;
    transmit the first control signal to a first controller coupled in communication with the central controller;
    receive a first feedback from the first controller confirming a receipt of the first control signal by the first controller;
    direct the FRS to refill the tank of the at least one autonomous truck with fluid;
    when the amount of fluid in the tank has reached a maximum threshold value, generate a second control signal to direct the FRS to stop refilling the tank;
    transmit the second control signal to the first controller;
    receive a second feedback from the first controller confirming a receipt of the second control signal by the first controller;
    direct the FRS to stop refilling the tank;
    generate a third control signal to mark the FRS as non-functional based on at least one of:
      a failure in receipt of the first feedback from the first controller,
      a failure in receipt of the second feedback from the first controller, or
      a determination of an anomaly with the FRS; and
    mark the FRS as non-functional based on the third control signal.

* * * * *